US008956120B2

(12) United States Patent
Giametta

(10) Patent No.: US 8,956,120 B2
(45) Date of Patent: Feb. 17, 2015

(54) NON-CONTINUOUS RING SEAL

(75) Inventor: Andrew Paul Giametta, Greenville, SC (US)

(73) Assignee: General Electric Company, Schenectady, NY (US)

(*) Notice: Subject to any disclaimer, the term of this patent is extended or adjusted under 35 U.S.C. 154(b) by 702 days.

(21) Appl. No.: 13/227,854

(22) Filed: Sep. 8, 2011

(65) Prior Publication Data

US 2013/0064645 A1 Mar. 14, 2013

(51) Int. Cl.
*F01D 5/06* (2006.01)
*F16J 15/08* (2006.01)
*F01D 11/00* (2006.01)
*F16J 15/16* (2006.01)

(52) U.S. Cl.
CPC ............ *F16J 15/0887* (2013.01); *F01D 11/006* (2013.01); *F16J 15/164* (2013.01)
USPC ..................................................... 416/198 A

(58) Field of Classification Search
CPC ....................................................... F01D 11/006
USPC ................................................. 416/198 A, 95
See application file for complete search history.

(56) References Cited

U.S. PATENT DOCUMENTS

| 3,356,339 | A |   | 12/1967 | Thomas et al. |
| 3,745,628 | A | * | 7/1973 | Stahl ............................. 29/889.2 |
| 4,484,858 | A |   | 11/1984 | Kurosawa et al. |
| 5,167,485 | A |   | 12/1992 | Starkweather |
| 5,292,138 | A |   | 3/1994 | Glynn et al. |
| 5,865,600 | A | * | 2/1999 | Mori et al. ................. 416/198 A |
| 6,089,827 | A | * | 7/2000 | Ichiryu et al. ............. 416/198 A |
| 6,315,301 | B1 |   | 11/2001 | Umemura et al. |

OTHER PUBLICATIONS

Search Report and Written Opinion from EP Application No. 12182660.6 dated Dec. 19, 2012.

* cited by examiner

*Primary Examiner* — Nathaniel Wiehe
*Assistant Examiner* — Kayla McCaffrey
(74) *Attorney, Agent, or Firm* — Dority & Manning, PA

(57) ABSTRACT

An assembly is disclosed that includes a first rotating component and a second rotating component disposed adjacent to the first rotating component. An annular slot may be defined between the first and second rotating components and may include a sealing surface. Additionally, a seal may be disposed within the annular slot and may be configured to be engaged against the sealing surface when the first and second rotating components are rotated. Moreover, the seal may form a non-continuous ring within the annular slot when the seal is engaged against the sealing surface.

17 Claims, 4 Drawing Sheets

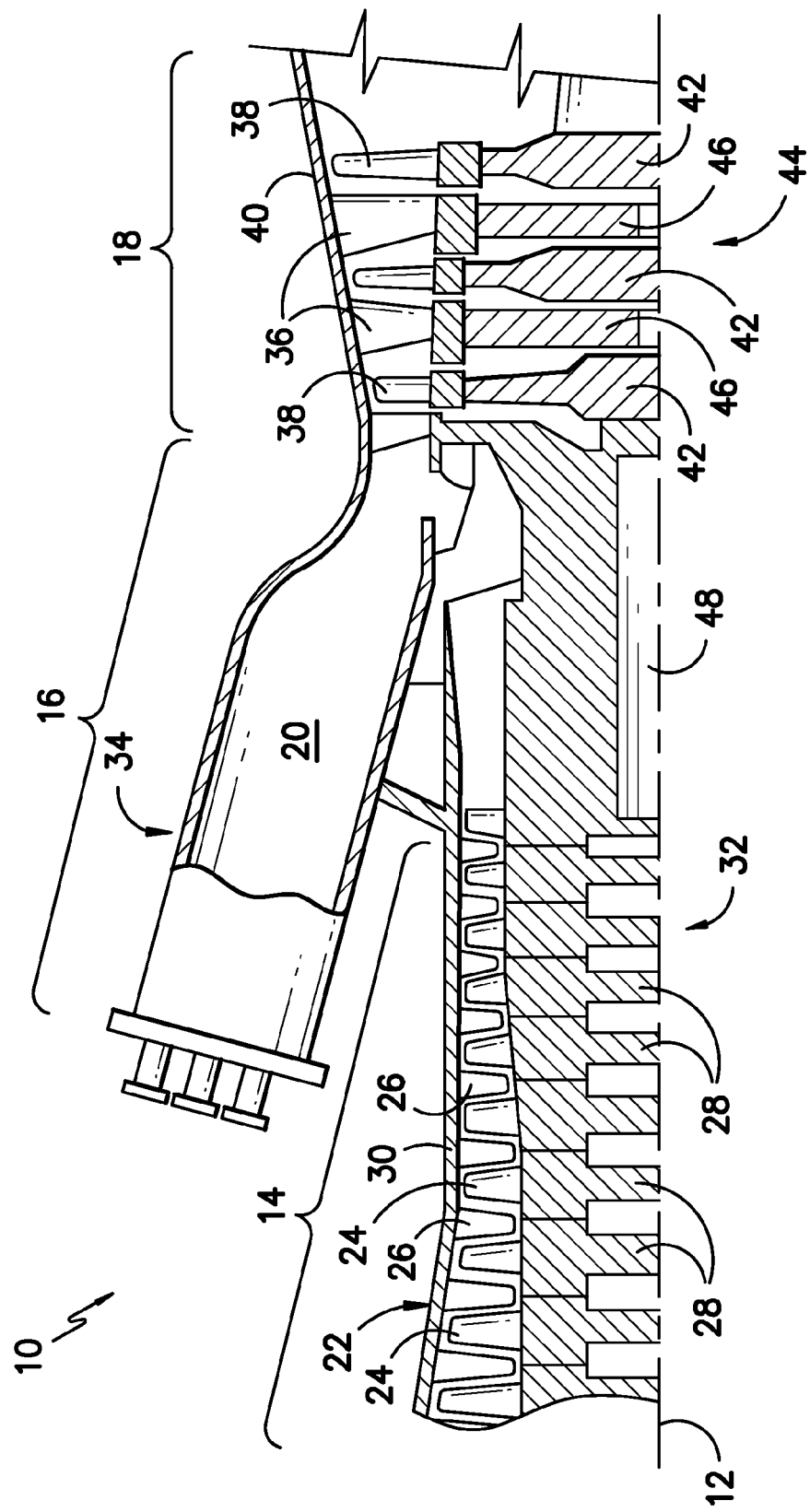
FIG. -1-

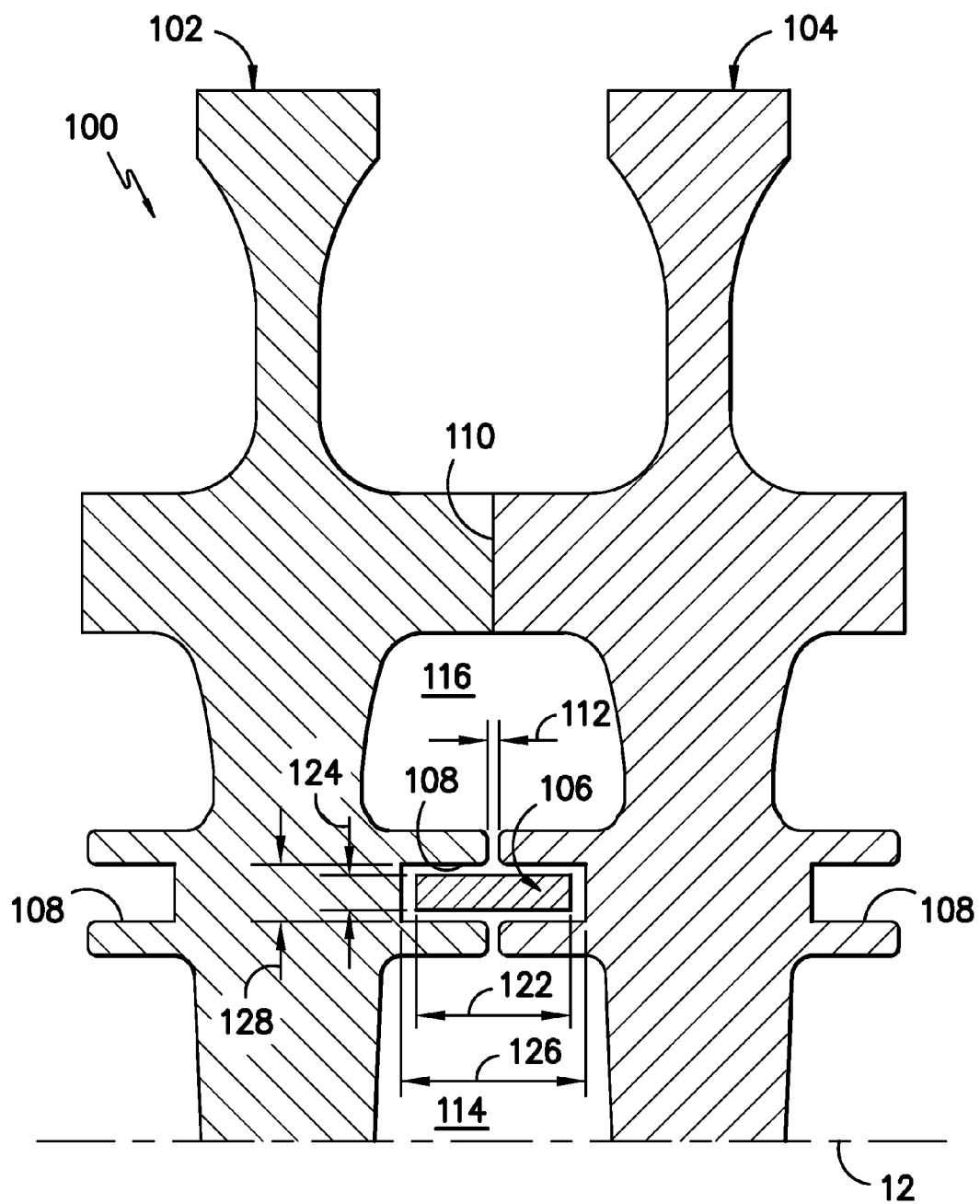
FIG. -2-

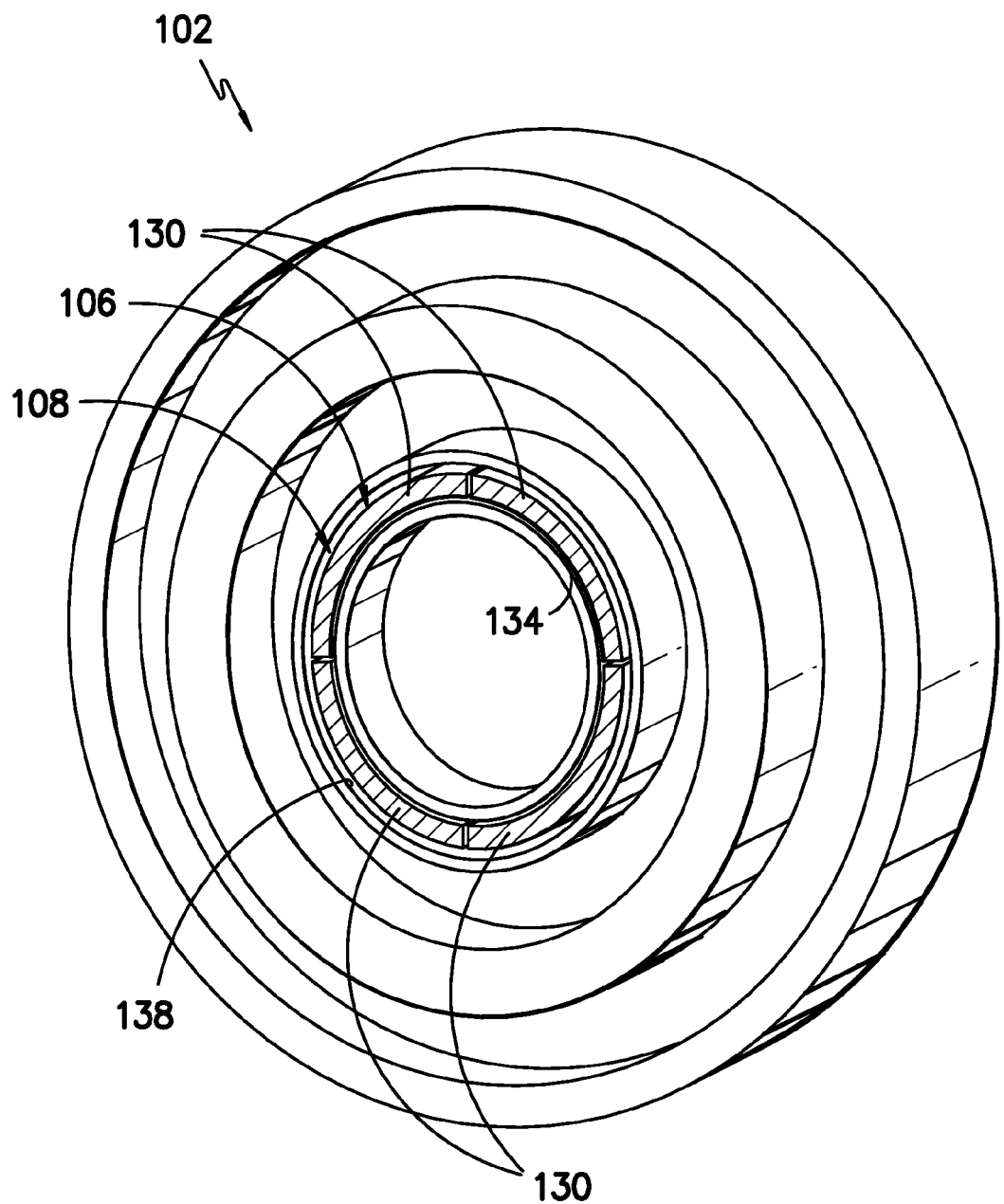
FIG. -3-

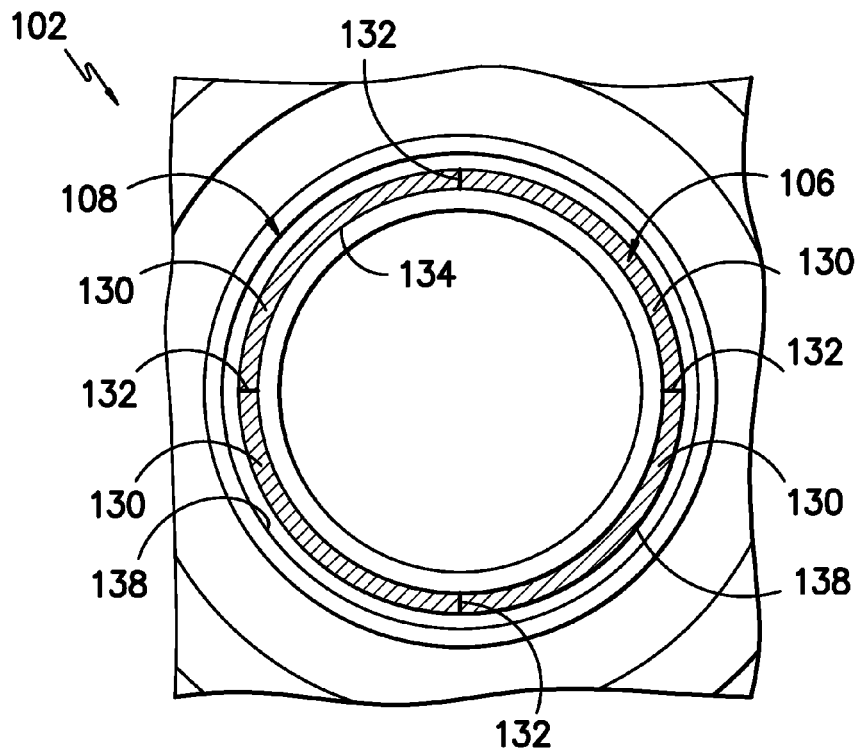
FIG. —4—
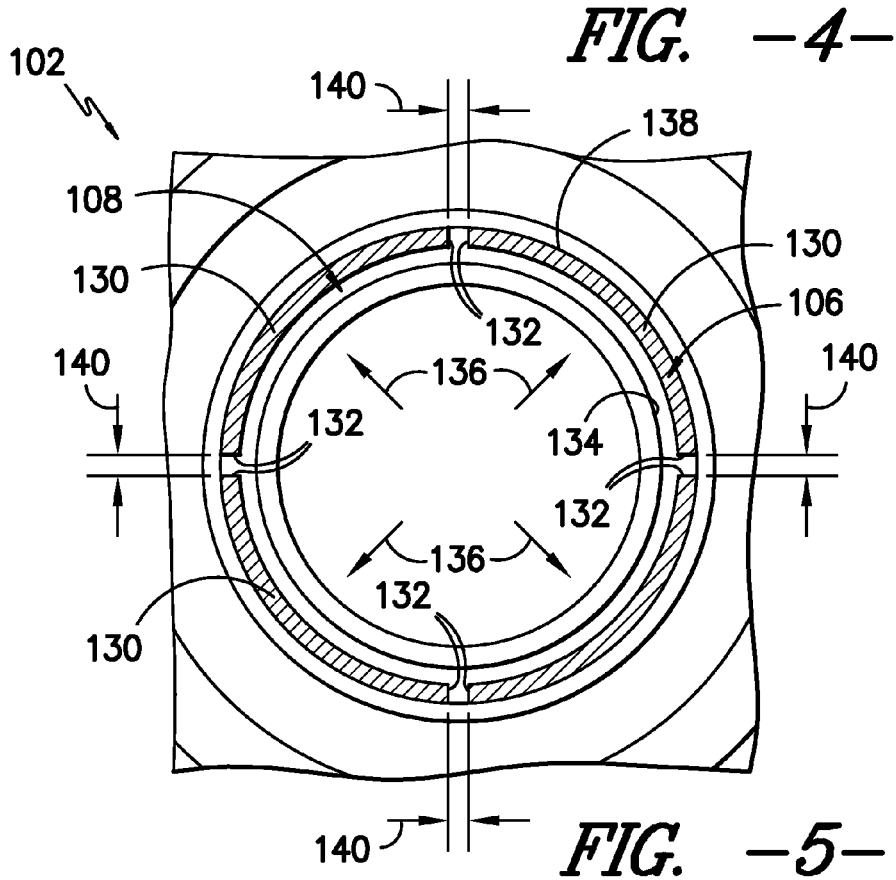
FIG. —5—

NON-CONTINUOUS RING SEAL

FIELD OF THE INVENTION

The present subject matter relates generally to a non-continuous ring seal and, more particularly, to a non-continuous ring seal that may be used to seal a gap between rotating components, such as adjacent rotor disks, of a gas turbine.

BACKGROUND OF THE INVENTION

In turbomachinery and in many other mechanical applications, it is often required that fluid in a high pressure cavity be prevented from flowing into a lower pressure cavity. For instance, in gas turbine systems, a compressed working fluid (e.g., pressurized air from the compressor) may be supplied to many high pressure areas of the gas turbine to provide cooling. As an example, the working fluid may be supplied to high pressure cavities defined between adjacent rotor disks of the gas turbine to cool portions of the disks. However, due to gaps between the rotor disks, a significant portion of the working fluid may often leak to lower pressure cavities at or adjacent to the disks, thereby leading to decreased performance and/or efficiency of the gas turbine.

Various strategies are known in the art to prevent system losses due to fluid leakage between adjacent components. For example, piston ring seals and other continuous ring seals have been utilized in the past to seal the gaps between adjacent rotating components, such as adjacent rotor disks of a gas turbine. However, due to their fixed, annular geometry, these seals are often difficult to install between such components. Moreover, in gas turbine applications, it is often desirable to have a small fraction of the pressurized fluid contained within the high pressure cavities of the turbine to flow into lower pressure cavities to prevent uneven thermal growth of the components disposed adjacent to such cavities. However, by forming an unbroken, continuous annular shape, piston ring seals and other continuous ring seats may completely seal off the gap defined between adjacent rotating components, thereby preventing any of the pressurized fluid from passing into a lower pressure cavity disposed adjacent to the rotating components.

Accordingly, a seal that substantially seals a gap defined between adjacent rotating components and that also allows for a small fraction of pressurized fluid to pass through the seal would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter discloses an assembly including a first rotating component and a second rotating component disposed adjacent to the first rotating component. An annular slot may be defined between the first and second rotating components and may include a sealing surface. Additionally, a seal may be disposed within the annular slot and may be configured to be engaged against the sealing surface when the first and second rotating components are rotated. Moreover, the seal may form a non-continuous ring within the annular slot when the seal is engaged against the sealing surface.

In another aspect, the present subject matter discloses a rotor assembly. The rotor assembly may include a first rotor disk and a second rotor disk disposed adjacent to the first rotor disk. An annular slot may be defined between the first and second rotor disks and may include a sealing surface. Additionally, a seal may be disposed within the annular slot and may be configured to be engaged against the sealing surface when the first and second rotor disks are rotated. Moreover, the seal may form a non-continuous ring within the annular slot when the seal is engaged against the sealing surface.

In a further aspect, the present subject matter discloses a gas turbine. The gas turbine may include a compressor section, a combustion section downstream of the compressor section, a turbine section downstream of the combustion section and a rotor assembly. The rotor assembly may include a first rotor disk and a second rotor disk disposed adjacent to the first rotor disk. An annular slot may be defined between the first and second rotor disks and may include a sealing surface. Additionally, a seal may be disposed within the annular slot and may be configured to be engaged against the sealing surface when the first and second rotor disks are rotated. Moreover, the seal may form a non-continuous ring within the annular slot when the seal is engaged against the sealing surface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a partial, cross-sectional view of one embodiment of a gas turbine cut-off at the turbine's centerline;

FIG. 2 illustrates a partial, cross-sectional view of one embodiment of a rotor assembly in accordance with aspects of the present subject matter, particularly illustrating adjacent rotor disks of the rotor assembly with a ring seal disposed therebetween;

FIG. 3 illustrates a perspective view of one of the rotor disks shown in FIG. 2, particularly illustrating the ring seal disposed within an annular seal slot defined in the rotor disk;

FIG. 4 illustrates a partial, side view of the rotor disk shown in FIG. 3, particularly illustrating the ring seal in a non-operating position within the annular seal slot; and FIG. 5 illustrates a partial, side view of the rotor disk shown in FIG. 3, particularly illustrating the ring seal in an operating position within the annular seal slot.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a non-continuous ring seal for substantially sealing a gap between adjacent rotating components. In particular, the present subject matter discloses a ring seal that forms a non-continuous ring between adjacent components as such components are being rotated. For example, in several embodiments, the ring seal may be segmented around its circumference such that, during rotation of the adjacent components, the segments (or the ends of a single segment) of the ring seal may separate and define one or more flow gaps to permit pressurized fluid to pass through the seal.

In a particular embodiment of the present subject matter, the ring seal may be used to seal a gap defined between adjacent rotor disks of a gas turbine. By configuring the ring seal to form a non-continuous ring when the rotor disks rotate during operation of the gas turbine, the ring seal may permit a portion of the working fluid supplied by the gas turbine compressor to pass into a low pressure cavity defined between the rotor disks, thereby providing cooling to such cavity and preventing uneven thermal growth of the rotor disks.

It should be appreciated that, although the disclosed ring seal will generally be described herein with reference to adjacent rotor disks of a gas turbine, the ring seal may generally be utilized to seal a gap defined between any rotating components of a gas turbine. Moreover, application of the present subject matter need not be limited to gas turbines. Specifically, the disclosed ring seal may be utilized to seal a gap defined between adjacent rotating components of any suitable machine.

Referring now to the drawings, FIG. 1 illustrates a partial, cross-sectional view of one embodiment of a gas turbine 10 cut-off at the turbine's centerline 12. As shown, the gas turbine 10 includes a compressor section 14, a combustion section 16 disposed downstream of the compressor section 14 and a turbine section 18 disposed downstream of the combustion section 16. The compressor section 14 may generally be configured to pressurize air flowing into the turbine 10. A portion of the pressurized air or working fluid then flows into the combustion section 16, wherein the air is mixed with fuel and combusted. Hot gases of combustion then flow through a transition piece 20 along an annular hot gas path to the turbine section 18 to drive the gas turbine 10 and generate power.

In several embodiments, the compressor section 14 may include an axial flow compressor 22 having a plurality of compressor stages characterized by alternating rows of rotor blades 24 and stator vanes 26. Specifically, each compressor stage may include a row of circumferentially spaced rotor blades 24 mounted to a compressor rotor disk 28 and a row of circumferentially spaced stator vanes 26 attached to a static compressor casing 30. The alternating rows of rotor blades 24 and stator vanes 26 may generally be configured to incrementally increase the pressure of the air flowing through the compressor 22 such that a desired increase in pressure is reached. The compressor rotor disks 28, along with the rotor blades 24, generally comprise the rotating components of the compressor 22 and, thus, may form a compressor rotor assembly 32. For example, in several embodiments, the compressor rotor disks 28 may be stacked axially against one another about the turbine centerline 12 such that torque may be transmitted between the rotor disks 28.

The combustion section 16 of the gas turbine 10 may generally be characterized by a plurality of combustors 34 (one of which is shown) disposed in an annular array about the turbine centerline 12. Each combustor 34 may generally be configured to receive a portion of the pressurized air discharged from the compressor 22, mix the air with fuel to form an air/fuel mixture and combust the mixture to produce hot gases of combustion. As indicated above, the hot gases of combustion may then flow from each combustor 34 through a transition piece 20 to the turbine section 18 of the gas turbine 10.

The turbine section 18 may generally include a plurality of turbine stages characterized by alternating rows of turbine nozzles 36 and turbine buckets 38. In particular, each turbine stage may include a row of circumferentially spaced turbine nozzles 36 attached to a static turbine casing 40 and a row of circumferentially spaced turbine buckets 38 mounted to a turbine rotor disk 42. The alternating rows of turbine nozzles 36 and buckets 38 may generally be configured to incrementally convert the energy of the hot gases of combustion into work manifested by rotation of the turbine rotor disks 42. The turbine rotor disks 42, along with the turbine buckets 38, may generally comprise the rotating components of the turbine section 18 and, thus, may form a turbine rotor assembly 44. Similar to the compressor rotor disks 28, the turbine rotor disks 42 may generally be stacked together axially along the turbine centerline 12. For example, as shown in FIG. 1, the turbine rotor disks 42 may be spaced apart from one another by spacer disks 46, with the rotor disks 42 and spacer disks 46 being stacked axially against one another such that torque may be transmitted between the rotor disks 42.

Referring now to FIGS. 2-5, one embodiment of a rotor assembly 100 suitable for use within the gas turbine 10 shown in FIG. 1 is illustrated in accordance with aspects of the present subject matter. Specifically, FIG. 2 illustrates a partial, cross-sectional view of two adjacent rotor disks 102, 104 of the rotor assembly 100 having a ring seal 106 disposed within a seal slot 108 defined between the rotor disks 102, 104. FIG. 3 illustrates a perspective view of one of the rotor disks 102 shown in FIG. 2, particularly illustrating a cross-sectional view of the ring seal 106 disposed within the portion of the seal slot 108 defined by the rotor disk 102. Additionally, FIGS. 4 and 5 illustrate a side view of the rotor disk 102 shown in FIG. 3, with the ring seal 106 being shown within the seal slot 108 in both a non-operating position (FIG. 4) and an operating position (FIG. 5).

As shown, the rotor assembly 100 generally includes a first rotor disk 102 and a second rotor disk 104. In general, the first and second rotor disks 102, 104 may be configured the same as or similar to any compressor rotor disk 28 (FIG. 1), turbine rotor disk 42 (FIG. 1) and/or any other suitable rotor disk or wheel known in the art. Thus, in several embodiments, each rotor disk 102, 104 may include suitable attachment features for attaching a plurality of compressor rotor blades 24 (FIG. 1) and/or turbine buckets 38 (FIG. 1) around its outer perimeter. For example, each rotor disk 102, 104 may include a plurality of root slots (not shown), such as a plurality of dovetail slots, defined around its outer perimeter, with each root slot being configured to receive a correspondingly shaped root (not shown) of each rotor blade 24 and/or turbine bucket 38. Additionally, the rotor disks 102, 104 may be configured to be stacked axially together about the turbine centerline 12. For instance, as shown in FIG. 2, the first and second rotor disks 102, 104 may be stacked together such that a frictional interface 110 is defined between the rotor disks 102, 104 at one or more radial locations for transferring torque between the disks 102, 104.

It should be appreciated that, although the rotor assembly 100 is shown as including two rotor disks 102, 104, the rotor assembly 100 may generally include any number of rotor disks.

Additionally, the rotor assembly 100 may include a ring seal 106 configured to substantially seal a gap 114 defined between the first and second rotor disks 102, 104. For example, in several embodiments, the ring seal 106 may be configured to limit the amount of working fluid that enters particular spaces defined between the rotor disks 102, 104, such as by providing a seal between a high pressure cavity 114 and a low pressure cavity 116 defined between the rotor disks 102, 104. By providing such a seal, the ring seal 106 may reduce flow leakage between the rotor disks 102, 104, thereby improving the performance and/or efficiency of the gas turbine 10.

It should be appreciated that the high and low pressure cavities 114, 116 defined between the rotor disks 102, 104 may generally be disposed at any suitable location relative to one another and/or relative to the rotor disks 102, 104. Thus, the high and low pressure cavities 114, 116 need not be disposed at the exact locations shown in FIG. 2.

The ring seal 106 may generally be configured to be positioned between the rotor disks 102, 104 within an annular seal slot 108 defined by one or both of the rotor disks 102, 104. For example, as particularly shown in FIG. 2, in one embodiment, a portion of the seal slot 108 may be defined by each of the rotor disks 102, 104, such as by forming a first portion of the slot 108 within the first rotor disk 102 and a second portion of the slot 108 within the second rotor disk 104. However, in other embodiments, the seal slot 108 may be formed primarily and/or entirely within the first rotor disk 102 or the second rotor disk 104.

It should be appreciated that the dimensions of the ring seal 106 and the seal slot 108 may generally be chosen such that the ring seal 106 may be installed within the seal slot 108. For example, in several embodiments, a width 122 and a height 124 of the ring seal 106 may be less than a width 126 and a height 128 of the seal slot 108. Similarly, in one embodiment, the radius (not shown) defined by the ring seal 106 may generally correspond to the radius (not shown) defined by a portion of the seal slot 108.

Additionally, it should be appreciated that the first and second rotor disks 102, 104 may also define additional seal slots 108 for receiving ring seals 106 between such disks 102, 104 and other adjacent rotor disks. For example, as shown in FIG. 2, an additional seal slot 108 may be defined in the first rotor disk 102 on the side opposite the frictional interface 110 defined between the first and second rotor disks 102, 104. As such, a ring seal 106 may be positioned within the seal slot 108 and may extend into a corresponding seal slot (not shown) of an adjacent rotor disk. Similarly, an additional seal slot 108 may be defined in the second rotor disk 104 opposite the frictional interface 110 surface such that a ring seal 108 may be positioned within the seal slot 108 and may extend axially into a corresponding seal slot (not shown) of a rotor disk disposed adjacent to the second rotor disk 104.

Moreover, as indicated above, the ring seal 106 may be segmented at one or more locations around its circumference. Specifically, in several embodiments, the ring seal 106 may be formed from a plurality of separate arcuate segments 130 configured to define a generally ring-like or annular shape within the seal slot 108. For example, as particularly shown in FIGS. 3-5, in one embodiment, the ring seal 106 may be formed from four arcuate segments 130 that, when assembled end-to-end, define a generally annular shape. However, in alternative embodiments, it should be appreciated that the ring seal 106 may be formed from any suitable number of arcuate segments 130, such as less than four arcuate segments 130 or greater than four segments 130. For instance, in one embodiment, the ring seal 106 may be formed from two arcuate segments 130, with each segment 130 generally defining half of the overall circumference of the ring seal 106.

By segmenting the ring seal 106 around its circumference, the ring seal 106 may be adapted to form a non-continuous or broken ring during rotation of the rotor disks 102, 104. Specifically, as shown in FIG. 4, in one embodiment, the arcuate segments 130 may be dimensioned such that adjacent ends 132 of the arcuate segments 130 may abut one another when the ring seal 106 is disposed against a radially inner surface 134 of the seal slot 108. For instance, each arcuate segment 130 may define a radius (not shown) that is the same as or similar to the radius (not shown) defined by the radially inner surface 134. However, as shown in FIG. 5, upon rotation of the rotor disks 102, 104, centrifugal forces (indicated by arrows 136) may force the arcuate segments 130 radially outwardly within the seal slot 108 and into sealing engagement against a radially outer or sealing surface 138 of the seal slot 108. As such, the ends 132 of the arcuate segments 130 may separate from one another around the circumference of the ring seal 106, thereby forming a non-continuous or broken ring. In other words, the ring seal 106 may define a plurality of flow gaps 140 between the ends 132 of adjacent arcuate segments 130 when the segments 130 are sealing engagement against the sealing surface 138. As a result, a fraction of the working fluid flowing within the high pressure cavity 114 may be directed into the low pressure cavity 116 through the flow gaps 140, thereby providing flow within the low pressure cavity 116 and driving desired thermal growth of the rotor disks 102, 104. For instance, the working fluid flowing through the flow gaps 140 may thermally activate the portions of the rotor disks 102, 104 disposed adjacent to the lower pressure cavity 114, thereby reducing the thermal gradient within each rotor disk 102, 104.

It should be appreciated that, in alternative embodiments, the ends 132 of the arcuate segments 130 need not be configured to abut against one another when the rotor disks 102, 104 are not rotating. For example, in one embodiment, the arcuate segments 130 may be designed such that, even when the segments 130 are disposed around the radially inner surface 134 of the seal slot 108, flow gaps 140 may be defined between the ends 132 of adjacent segments 130. As such, upon rotation of the rotor disks 102 104, the flows gaps 140 may increase in size as the arcuate segments 130 are forced radially outwardly against the sealing surface 138 of the seal slot 108.

It should also be appreciated that the amount of working fluid passing through the flow gaps 140 may generally vary depending on the dimensions of the arcuate segments 130, the dimensions of the seal slot 108, and/or the dimensions of the gap 112 defined between the rotor disks 102, 104. Specifically, by varying the dimensions of such features, a leakage area defined between the rotor disks 102, 104 (i.e., the total area defined between the rotor disks 102, 104 around the circumference of the gap 112) may be varied. For example, in several embodiments, the arcuate segments 130 and/or the seal slot 108 may be designed such that the ring seal 106 reduces the leakage area defined between the rotor disks 102, 104 from greater than about 60% to less than 100%, such as a percentage leakage area reduction ranging from about 65% to about 95% or from about 75% to about 85% and all other subranges therebetween. It should be appreciated that a 100% reduction in leakage area may generally correspond to a leak-free seal being formed between the rotor disks 102, 104. Thus, by configuring the ring seal 106 such that the leakage area reduction provided by the seal 106 is less than 100%, a fraction of the working fluid flowing within the high pressure cavity 114 may flow through the flow gaps 140 and into the low pressure cavity 116.

Additionally, in an alternative embodiment, it should be appreciated that the ring seal 106 may be formed from a single arcuate segment. Specifically, in one embodiment, the ring seal 106 may be formed from an arcuate segment that extends end-to-end so as to define a generally annular shape (e.g., an arcuate segment that forms a 360 degree ring when the ends of the segment abut against another). For instance, the ends of the single arcuate segment may be configured to abut against one another when the segment is wrapped around the radially inner surface 134 of the seal slot 108. However, when the rotor disks 102, 104 are rotated, the ends of the arcuate segment may separate from another so as to define a flow gap 140 to permit a fraction of the working fluid to pass from the high pressure cavity 114 to the low pressure cavity 116.

Moreover, as indicated above, it should be appreciated that the disclosed ring seal 106 may be utilized to seal a gap 112 defined between any rotating components of a gas turbine 10 and, thus, need not be limited to use between adjacent rotor disks 102, 104. For instance, in one embodiment, the ring seal 106 may be utilized to seal a gap defined between a rotor disk 42 and a spacer disk 46 of a turbine rotor assembly 44 (FIG. 1). In another embodiment, the ring seal 106 may be utilized to a seal a gap defined between rotating components of any other suitable rotary machine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An assembly comprising:
   a first rotating component;
   a second rotating component disposed adjacent to said first rotating component, said first and second rotating component concentrically aligned along an axial centerline, wherein said first rotating component is engaged with said second rotating component along a frictional interface, said frictional interface defined radially outwardly from said axial centerline;
   a high pressure cavity defined between said first and second rotating components, wherein said high pressure cavity is defined proximate to said axial centerline;
   a low pressure cavity defined between said first and second rotating components radially outwardly from said high pressure cavity and radially inwardly from said frictional interface with respect to said axial centerline;
   an annular slot defined between said first and second rotating components, said annular slot being defined between said high pressure and low pressure cavities, said annular slot including a sealing surface; and
   a seal disposed within said annular slot, said seal being configured to be engaged against said sealing surface when said first and second rotating components are rotated, wherein at least one circumferential flow gap is defined around a circumference of said seal when said seal is engaged against said sealing surface, where said flow gap provides for fluid communication from said high pressure cavity into said low pressure cavity.

2. The assembly of claim 1, wherein said seal is formed from a plurality of arcuate segments.

3. The assembly of claim 1, wherein a leakage area is defined between said first and second rotating components.

4. The assembly of claim 3, wherein said seal is configured to reduce the leakage area defined between said first and second rotating components by greater than about 60% and less than 100%.

5. The assembly of claim 1, wherein said first rotating component comprises a first rotor disk and said second rotating component comprises a second rotor disk.

6. A rotor assembly, comprising:
   a first rotor disk;
   a second rotor disk disposed adjacent said first rotor disk, said first and second rotor disks concentrically aligned along an axial centerline, wherein said first rotor disk is engaged with said second rotor disk along a frictional interface, said frictional interface defined radially outwardly from said axial centerline;
   a high pressure cavity defined between said first and second rotor disks, wherein said high pressure cavity is defined proximate to said axial centerline;
   a low pressure cavity defined between said first and second rotor disks radially outwardly from said high pressure cavity and radially inwardly from said frictional interface with respect to said axial centerline;
   an annular slot defined between said first and second rotating components, said annular slot being defined between said high pressure and low pressure cavities, said annular slot including a sealing surface; and
   a seal disposed within said annular slot, said seal being configured to be engaged against said sealing surface when said first and second rotor disks are rotated, wherein at least one circumferential flow gap is defined around a circumference of said seal when said seal is engaged against said sealing surface, where said flow gap provides for fluid communication from said high pressure cavity into said low pressure cavity.

7. The rotor assembly of claim 6, wherein said seal is formed from a plurality of arcuate segments.

8. The rotor assembly of claim 6, wherein a leakage area is defined between said first and second rotor disks.

9. The rotor assembly of claim 8, wherein said seal is configured to reduce the leakage area defined between said first and second rotor disks by greater than about 60% and less than 100%.

10. The rotor assembly of claim 6, wherein said first and second rotor disks comprise compressor rotor disks, 11. The rotor assembly of claim 6, wherein said first and second rotor disks comprise turbine rotor disks.

12. A gas turbine comprising:
   a compressor section;
   a combustion section downstream of the compressor section;
   a turbine section downstream of the combustion section; and
   a rotor assembly comprising:
      a first rotor disk;
      a second rotor disk disposed adjacent said first rotor disk, said first and second rotor disks concentrically aligned centerline, wherein said first rotor disk is engaged with said second rotor disk along a frictional interface, said frictional interface defined radially outwardly from said axial centerline;

a high pressure cavity defined between said first and second rotor disks, wherein said high pressure cavity is defined proximate to said axial centerline;

a low pressure cavity defined between said first and second rotor disks radially outwardly from said high pressure cavity and radially inwardly from said frictional interface with respect to said axial centerline;

an annular slot defined between said first and second rotating components, said annular slot being defined between said high pressure and low pressure cavities, said annular slot including a sealing surface; and a seal disposed within said annular slot, said seal being configured to be engaged against said sealing surface when said first and second rotor disks are rotated, wherein at least one circumferential flow gap is defined around a circumference of said seal when said seal is engaged against said sealing surface, where said flow gap provides for fluid communication from said high pressure cavity into said low pressure cavity.

13. The gas turbine of claim 12, wherein said seal is formed from a plurality of arcuate segments.

14. The gas turbine of claim 12, wherein a leakage area is defined between said first and second rotor disks.

15. The gas turbine of claim 14, wherein said seal is configured to reduce the leakage area defined between said first and second rotor disks by greater than about 60% and less than 100%.

16. The gas turbine of claim 12, wherein said rotor assembly comprises a compressor rotor assembly, 17. The gas turbine of claim 12, wherein said rotor assembly comprises a turbine rotor assembly.

* * * * *

UNITED STATES PATENT AND TRADEMARK OFFICE
CERTIFICATE OF CORRECTION

PATENT NO. : 8,956,120 B2
APPLICATION NO. : 13/227854
DATED : February 17, 2015
INVENTOR(S) : Andrew Paul Giametta It is certified that error appears in the above-identified patent and that said Letters Patent is hereby corrected as shown below:

In the Claims

Column 8, Claim 10, line 51 reads "rotor disks," should read --rotor disks.--

Column 8, Claim 12, line 64 reads "aligned centerline, wherein said first rotor disk is" should read --aligned along an axial centerline, wherein said first rotor disk is--

Signed and Sealed this
Twenty-fourth Day of November, 2015

Michelle K. Lee
*Director of the United States Patent and Trademark Office*